US009540103B2

(12) United States Patent
Long

(10) Patent No.: US 9,540,103 B2
(45) Date of Patent: Jan. 10, 2017

(54) PASSIVE DEPLOYMENT MECHANISM FOR LIFT FAN

(71) Applicant: Kitty Hawk Corporation, Mountain View, CA (US)

(72) Inventor: Geoffrey A. Long, Half Moon Bay, CA (US)

(73) Assignee: Kitty Hawk Corporation, Mountain View, CA (US)

( * ) Notice: Subject to any disclaimer, the term of this patent is extended or adjusted under 35 U.S.C. 154(b) by 563 days.

(21) Appl. No.: 14/313,680

(22) Filed: Jun. 24, 2014

(65) Prior Publication Data

US 2015/0367935 A1    Dec. 24, 2015

(51) Int. Cl.
| | | |
|---|---|---|
| *B64C 27/00* | (2006.01) | |
| *B64C 39/02* | (2006.01) | |
| *B64C 27/32* | (2006.01) | |
| *B64C 27/24* | (2006.01) | |

(52) U.S. Cl.
CPC .............. *B64C 39/024* (2013.01); *B64C 27/32* (2013.01); *B64C 27/24* (2013.01); *B64C 2201/102* (2013.01); *B64C 2201/108* (2013.01)

(58) Field of Classification Search
CPC .......... B64C 11/28; B64C 11/04; B64C 27/48; B64C 27/50; B64C 2201/027
USPC ................................................... 416/14, 164
See application file for complete search history.

(56) References Cited

U.S. PATENT DOCUMENTS

| | | |
|---|---|---|
| 208,208 A | 9/1878 | Smith |
| 628,497 A | 7/1899 | Smith |
| 1,396,680 A | 11/1921 | Funk |
| 2,068,774 A | 1/1937 | Smith |
| 3,625,631 A | 12/1971 | Covington, Jr. et al. |
| 3,995,793 A | 12/1976 | Wing |
| 4,793,572 A | 12/1988 | Mecca |
| 5,211,538 A | 5/1993 | Seghal et al. |
| 6,622,962 B1 | 9/2003 | White |
| 2003/0206802 A1 | 11/2003 | Gmirya |
| 2006/0140769 A1 | 6/2006 | Frampton et al. |
| 2008/0272226 A1 | 11/2008 | Colclough |
| 2009/0097973 A1 | 4/2009 | Cabrera et al. |
| 2010/0135805 A1 | 6/2010 | Muylaert et al. |

(Continued)

FOREIGN PATENT DOCUMENTS

| | | |
|---|---|---|
| CN | 1062876 A | 7/1992 |
| CN | 201385780 Y | 1/2010 |

(Continued)

OTHER PUBLICATIONS

New Zealand Intellectual Property Office, Examination Report, New Zealand Patent Application No. 629367, Jun. 9, 2015, two pages.

(Continued)

*Primary Examiner* — Tien Dinh
*Assistant Examiner* — Aaron Rodziwicz
(74) *Attorney, Agent, or Firm* — Van Pelt, Yi & James LLP

(57) ABSTRACT

A vertical takeoff and landing aircraft includes rotors that provide vertical and horizontal thrust. During forward motion, the vertical lift system is inactive. A lift fan mechanism positions the fan blades of the aircraft in a collapsed configuration when the vertical lift system is inactive and positions the fan blades of the aircraft in a deployed configuration when the vertical lift system is active.

27 Claims, 9 Drawing Sheets

(56) References Cited

U.S. PATENT DOCUMENTS

| | | | |
|---|---|---|---|
| 2010/0264260 A1* | 10/2010 | Hammerquist | B64C 3/56 |
| | | | 244/49 |
| 2011/0293426 A1 | 12/2011 | Fucks et al. | |
| 2012/0045331 A1 | 2/2012 | Villella | |
| 2012/0219417 A1 | 8/2012 | Podgurski | |
| 2013/0084180 A1 | 4/2013 | Conley et al. | |
| 2013/0118856 A1* | 5/2013 | Long | F16D 43/18 |
| | | | 192/104 B |
| 2015/0028151 A1* | 1/2015 | Bevirt et al. | B64C 29/0025 |
| | | | 244/6 |

FOREIGN PATENT DOCUMENTS

| | | |
|---|---|---|
| CN | 101723087 A | 6/2010 |
| CN | 102556336 A | 7/2012 |
| DE | 10147866 A1 | 4/2003 |
| WO | WO 2006/001747 A1 | 1/2006 |

OTHER PUBLICATIONS

PCT International Search Report and Written Opinion, PCT Application No. PCT/182015/054652, Aug. 31, 2015, eleven pages.

Chinese First Office Action, Chinese Application No. 2013800540361, Nov. 2, 2015, 17 pages.

Canadian Office Action, Canadian Application No. 2,882,258, Mar. 11, 2016, 4 pages.

European Extended Search Report, European Application No. 13830270.8, Mar. 16, 2016, 8 pages.

Chinese Second Office Action, Chinese Application No. 201380054036.1, May 31, 2016, 11 pages.

PCT International Search Report and Written Opinion, PCT Application No. PCT/US2013/056527, Dec. 2, 2013, fourteen pages.

* cited by examiner

PASSIVE DEPLOYMENT MECHANISM FOR LIFT FAN

BACKGROUND

Field

The described embodiments relate to a variable geometry lift fan mechanism for a powered-lift aircraft.

Aircraft may use fixed wings, such as in a conventional airplane, rotary wings, such as in a helicopter, or a combination of fixed wings and rotary wings. Powered-lift aircraft, which derive lift in some flight regimes from rotary wings and in others from fixed wings, are desirable because they are able to perform very short or vertical takeoffs and landings. A powered-lift aircraft may have rotary wings, or rotors, that provide both vertical and horizontal thrust. Other types of powered-lift aircraft have one or more rotors (lift fans) for vertical thrust, and one or more rotors (propellers) for horizontal thrust. In some powered-lift aircraft the lift fans are inactive during forward flight.

In a powered-lift aircraft with lift fans, the fans may have four or more blades to provide the needed lift at rotational speeds while still allowing for quiet operation. The fan blades may have large chords and can be highly twisted. When the fan blades are stationary, these types of fans produce large amounts of aerodynamic drag due to flow separation and large frontal area from the blades. This reduces the performance of the aircraft. If the individual fan blades are aligned with the flow direction of air across the aircraft, both the frontal area and flow separation are reduced resulting in lower drag. While a two-bladed fan can be stopped with the blades aligned in the flow direction, this is not possible with fans of more than two blades.

SUMMARY

The embodiments herein disclose a lift fan of a powered-lift aircraft. The lift fan of the aircraft is configured to transition from a deployed configuration to a collapsed configuration and vice versa. In one embodiment, the deployed configuration of a lift fan corresponds to the best orientation of the fan blades of the lift fan for producing thrust. For example, 90 degree spacing between the blades of a four-bladed fan may correspond to a deployed configuration of a lift fan. The collapsed configuration of the lift fan describes the orientation of the fan blades of the lift fan when thrust is no longer needed. According to one embodiment, the collapsed configuration reduces the frontal area of the lift fan and the drag produced by the lift fan in forward flight by positioning the fan blades of the lift fan to be in-line with each other. Additionally, the collapsed configuration may reduce the overall width of the aircraft allowing for easier transport and storage.

In one embodiment, a mechanism is employed to move the blades of the lift fan between the deployed configuration and the collapsed configuration using the motor that drives the lift fan, obviating the need for additional motors and/or actuators. The torque of the motor can be precisely controlled and used to move the lift fan blades between the deployed and collapsed configurations. Mechanical stops may be incorporated into the blades of a lift fan. The position of the mechanical stops define the angle that the blades of the lift fan may rotate through with respect to one another in order to position the fan in the deployed configuration or the collapsed configuration.

A mechanism may be employed to resist the rotation of the blades out of either the deployed configuration or collapsed configuration. In one embodiment, the mechanism is a spring loaded pallet fork and is activated by centrifugal force. When the lift fan is at rest, the pallet fork locks the blades in the collapsed configuration. However, when the rotational velocity of the lift fan exceeds a threshold, centrifugal force causes the pallet fork to disengage, allowing the blades to move into the deployed configuration. The centrifugal force prevents the pallet fork from moving from the deployed configuration. Thus, the blades remain locked in the deployed configuration until the rotational velocity of the lift fan decreases below the threshold, at which point the centrifugal force is low enough for the pallet fork to allow the blades to move into the collapsed configuration.

The features and advantages described in this summary and the following detailed description are not intended to be limiting. Many additional features and advantages will be apparent to one of ordinary skill in the art in view of the drawings, specification and claims.

The figures depict, and the detail description describes, various non-limiting embodiments for purposes of illustration only. One skilled in the art will readily recognize from the following discussion that alternative embodiments of the structures and methods illustrated herein may be employed without departing from the principles described herein.

DETAILED DESCRIPTION

Figure 1:
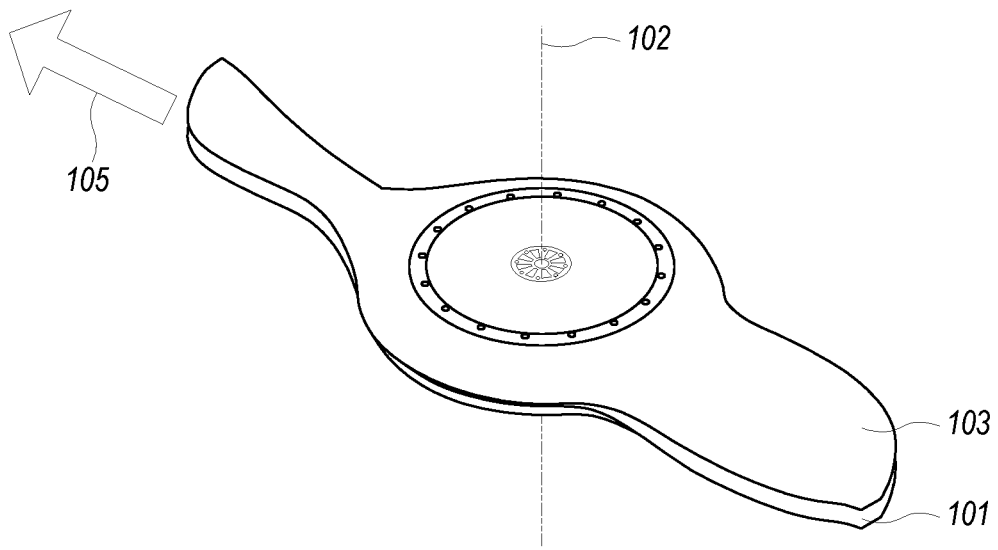
FIG. 1 illustrates a lift fan in a collapsed configuration according to one embodiment.

FIG. 1 illustrates a lift fan of a powered-lift aircraft according to one embodiment. The lift fan may generate vertical thrust for takeoff and landing of the powered-lift aircraft. The lift fan may comprise a stack of two or more sets of one or two fan blades, where the total number of blades is equal to the number needed in a baseline fixed-blade fan. Particularly, FIG. 1 illustrates a stack of two two-blade sets, for a total of four fan blades. In FIG. 1, blade set 101 represents a driven set of blades that is attached to a drive source such as an electric motor. Blade set 103 represents one or more additional following set of blades that are coupled to the driven blade set 101 by a mechanism allowing motion about the axis of rotation 102. The following blade set 103 may include one additional set of blades or two or more additional sets of blades.

In FIG. 1, the lift fan is shown in a collapsed configuration. When thrust is no longer needed such as during cruising flight or storage of the aircraft, the following blade set 103 can be rotated to the collapsed configuration shown in FIG. 1. The collapsed configuration reduces the frontal area and aerodynamic drag of the lift fan because the position of the fan blades in the collapsed configuration is in line with the travel of the aircraft represented by the arrow 105 in FIG. 1. Additionally, the collapsed configuration may reduce the overall width of the aircraft allowing for easier transport and storage. In the collapsed configuration, the driven blade set 101 and the following blade set 103 are positioned such that the fan blades of the driven blade set 101 and the following blade set 103 are in line with one another. That is, in the collapsed configuration a substantially zero-degree spacing (i.e., the stowed angle) is configured between a pair of fan blades of the lift fan.

Figure 2:
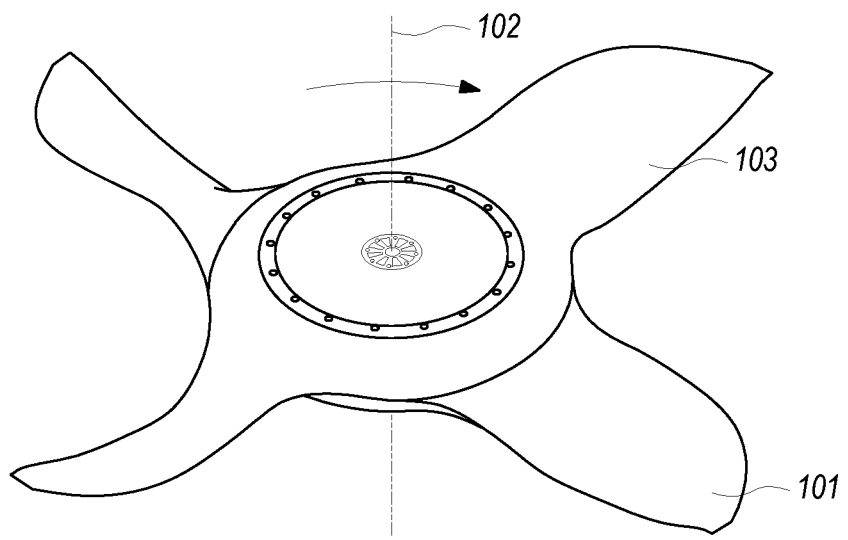
FIG. 2 illustrates the lift fan in a deployed configuration according to one embodiment.

FIG. 2 illustrates the lift fan of FIG. 1 in a deployed configuration according to one embodiment. When the lift fan is producing thrust, the following blade set 103 is rotated to its optimal thrust producing orientation as shown in FIG. 2. For example, in the deployed configuration a 90 degree spacing is configured between the driven blade set 101 and following blade set 103. However, in alternative embodiments the angle between the driven blade set 101 and following blade set 103 may be any angle greater than a stowed angle associated with a collapsed configuration and may include more than one following blade set. In one embodiment, the driven blade set 101 and following blade set 103 is made from a carbon fiber composite material. Alternatively, the driven blade set 101 and following blade set 103 is made from other materials, such as aluminum alloy.

The change from the deployed configuration to the collapsed configuration and vice-versa may be accomplished by several mechanisms. A mechanism may move the following blade set 103 between the deployed configuration and the collapsed configuration and vice-versa using the motor that powers the lift fan, and without the use of additional motors and/or actuators. In one embodiment, the following blade set 103 of a lift fan pivots about the rotational axis of the driven blade set 101 within a range of relative motion defined by mechanical stops that are engaged in both the collapsed and deployed configurations. In one embodiment, the mechanical stops are incorporated into the driven blade set 101 and the following blade set 103. A retention torque may be applied to hold the following blade set 103 against these mechanical stops so that aerodynamic or other disturbances do not cause the following blade set 103 to bounce on the stops or move out of the desired configuration, such as the deployed configuration or the collapsed configuration. The retention torque may be generated by various means.

When the lift fan is not used and is stationary with respect to the powered-lift aircraft, the lift fan is oriented in the collapsed configuration. When the lift fan is required to produce thrust, the lift fan is oriented in the deployed configuration, and spins within some nominal speed range depending on the required thrust. An example of a nominal operating speed range is from 2500 RPM to 3500 RPM. A motor applies torque to the lift fan in order to accelerate it from rest to the desired operating speed.

As the lift fan accelerates, the lift fan moves from the collapsed configuration to the deployed configuration before it reaches the lower bound of the operating speed range. The aerodynamic torque and inertia of the driven blade set 101 apply torque to the deployment mechanism in the direction that deploys the following blade set 103. The torque required to cause the transition from the collapsed configuration to the deployed configuration is called the deployment torque profile. In one embodiment, the deployment torque profile is designed such that the following blade set 103 moves from the collapsed configuration to the deployed configuration before the lift fan reaches the lower limit of the nominal operating speed range. The deployment torque is produced by a motor (e.g., an electric motor) that provides the power to spin the lift fan. The torque of the motor is precisely controlled to create the desired deployment torque profile.

As an example of how the deployment torque profile is designed, assume that the operating speed range of the lift fan is 2500 rpm to 4000 rpm. In this case, the desired threshold speed may be 1000 rpm, which is sufficiently far below the lower operating speed limit of 2500 rpm that an unintended collapsing of the mechanism can be prevented. The center of gravity 303 of the pallet fork 301 and the spring constant of the torsion spring 320 can be chosen such that the centrifugal force generated at 1000 rpm is sufficient to overcome the force generated by the torsion spring 320. To deploy the following fan, a torque is applied to the motor such that the rotor quickly accelerates to 900 rpm, then slowly accelerates from 800 rpm to 1200 rpm. As soon as the speed of the rotor exceeds the threshold speed, the pallet fork rotates from the first position to the second position and the aero torque on the following blades causes the following fan to move from the collapsed angle to the deployed angle as will be further described below. When the following fan is in the deployed angle, the pallet fork moves from the second position to the third position as will be further described below.

In this case, the collapsing torque profile may be designed as follows: The lift fan is decelerated quickly from its current speed in the operating speed range to 1200 rpm. The lift fan is then slowly decelerated from 1200 rpm to 800 rpm with a low enough deceleration rate that the aero torque on the following fan is sufficient to prevent it from leaving the mechanical stops. As soon as the speed drops below the threshold, the pallet fork moves from the third position to the second position. A negative torque pulse is then applied. The negative torque pulse decelerates the driven fan such that the relative angle between the driven fan and the following fan transitions from the deployed angle to the collapsed angle. Once the following fan reaches the collapsed angle, the pallet fork moves from the second position to the first position.

Figure 3:
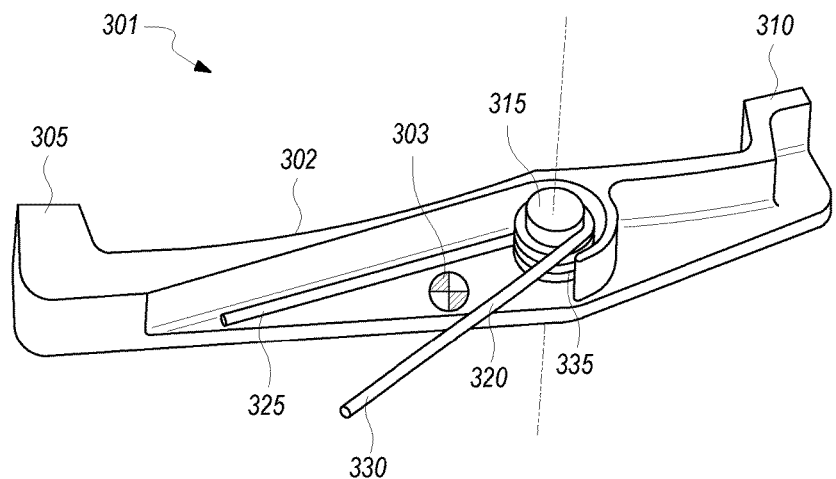
FIG. 3 illustrates a pallet fork according to one embodiment.

FIG. 3 illustrates a perspective view of the bottom side of a spring loaded pallet fork 301 according to one embodiment. The spring loaded pallet fork 301 is one example of a mechanism that provides the retention torque required to resist the rotation of the following blade set 103 from the deployed configuration shown in FIG. 2 to the collapsed configuration shown in FIG. 1 when the lift fan is providing vertical thrust above a threshold speed. Similarly, the spring loaded pallet fork 301 provides the retention torque required to resist the rotation of the following blade set 103 from the collapsed configuration to the deployed configuration when thrust is no longer needed such as during cruising flight or storage of the aircraft (i.e., below the threshold speed).

In one embodiment, the pallet fork 301 comprises a pallet fork body 302, a center of mass 303, a first pawl 305 (i.e., a first end), a second pawl 310 (i.e., a second end), a pivot 315, and a torsion spring 320. The first pawl 305 and second pawl 310 comprise surfaces that each engage a detent of the lift fan as will be further described below with respect to FIGS. 4 and 5. In some embodiments, the pawl surfaces are planar. The first pawl 305 and second pawl 310 each extend in a direction that is approximately 90 degrees from the length of the pallet fork body 302. Thus, the first pawl 305, in conjunction with the pallet fork body 302, makes an L-shape. Similarly, the second pawl 310 and the pallet fork body 302 also make an L-shape. When the following blade set 103 is collapsed and the pallet fork 301 is in a first position, the angle of the surface of the first pawl 305 affects the ease with which the pallet fork 301 moves from the first position to a second position when there is a tangential force between the two surfaces. If the angle is more obtuse, a tangential force will tend to slide the pallet fork 301 from the first position to the second position. If the angle is more acute, a tangential force will tend to lock the pallet fork 301 in the first position. If the angle is equal to the arctan of the coefficient of friction, a tangential force has no affect of the ease with which the pallet fork 301 moves from the first position to the second position. An equivalent situation exists for the surface of the second pawl 310 when the following blade set 103 is in the deployed configuration and the pallet fork 301 is in the third position.

The pallet fork 301 rotates about the pivot 315. The pivot 315 is a cylindrical post that protrudes perpendicularly from the pallet fork body 302. The pivot 315 is positioned on the pallet fork body 302 such that the pivot 315 is closer to the second pawl 310 than the first pawl 310 and the center of mass 303 is located in between the first pawl 305 and the pivot 315.

In one embodiment, the pallet fork 301 rotates between three distinct positions as mentioned above. The pallet fork 301 is in a first position when the pallet fork 301 is rotated clockwise when viewed from the bottom about the pivot 315 such that the first pawl 305 is engaged in a first detent 510 of a motor rotor 505, further described below with reference to FIG. 5. The first position of the pallet fork 301 is associated with the collapsed configuration of the lift fan, further described below with reference to FIG. 6A. The pallet fork 301 is in a second position when the pallet fork 301 is rotated such that neither the first pawl 305 nor the second pawl 310 are engaged in the first detent 510 or a second detent 515 of the motor rotor 505. The second position of the pallet fork 301 is associated with the transitional state of the lift fan between the collapsed and deployed configurations, further described below with reference to FIGS. 6B and 6C. The pallet fork 301 is in a third position when the pallet fork 301 is rotated such that the second pawl 310 is engaged in the second detent 515 of the motor rotor 505. The third position of the pallet fork 301 is associated with the deployed configuration of the lift fan, further described below with reference to FIG. 6D. In some embodiments, the pallet fork 301 may be made from a high strength aluminum or other materials such as titanium or steel.

The pallet fork 301 is preloaded to rotate clockwise when viewed from the bottom by the torsion spring 320 such that the first pawl 305 engages the first detent 510 on the motor rotor 505 (i.e. the pallet fork 301 is in its first position). The torsion spring 320 is a wire formed to have a first end 325, a second end 330, and a plurality of windings 335. The torsion spring 320 is mounted to the pallet fork 301 so that the plurality of windings 335 wrap around the pivot 315. The first end 325 of the torsion spring 320 abuts the pallet fork body 302, and the second end 325 of the torsion spring 320 abuts a surface of the following blade set 103 to which the pallet fork 301 is mounted. By applying a force to both the pallet fork body 302 and the surface of the following blade set 103, the torsion spring 320 preloads the pallet fork 301 to rotate clockwise when viewed from the bottom.

Figure 4:
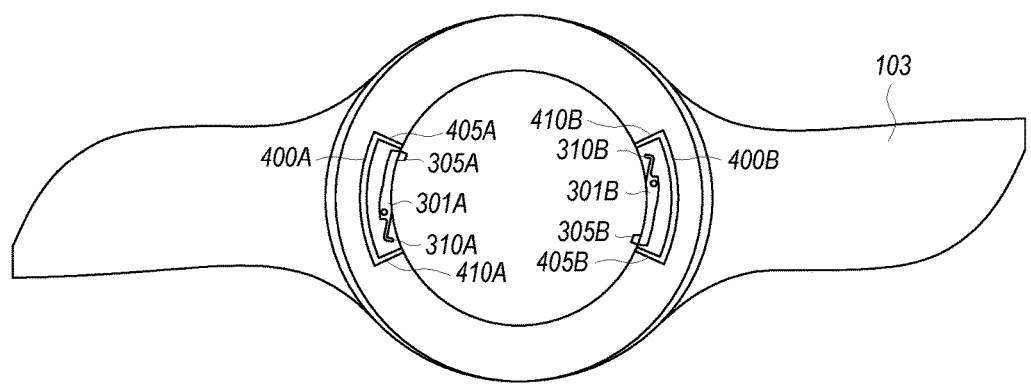
FIG. 4 illustrates pallet forks included in a lift fan mechanism according to one embodiment.

FIG. 4 illustrates a schematic of the following blade set 103 with two pallet forks 301A and 301B diametrically opposed to each other in the lift fan according to one embodiment. FIG. 4 illustrates a bottom view of the following blade set 103. As mentioned previously, the center of mass 303 of each pallet fork 301 is offset from the pivot 325 in the direction of the first pawl 305. When the lift fan is at rest (i.e. not rotating), the torsion spring 320 exerts a force on the pallet fork 301 such that the first pawl 305 extends inwards towards the center of the lift fan as shown in FIG. 4. However, when the lift fan starts spinning, centrifugal force is generated. The generated centrifugal force acts on the pallet fork 301 at its center of mass 303 to counter the force of the torsion spring 320. When the lift fan attains a threshold speed, the centrifugal force is greater than the force exerted by the torsion spring 320, causing the pallet fork 301 to pivot such that the first pawl 305 moves outward away from the center of the lift fan.

The following blade set 103 further comprises a plurality of housings 400A and 400B. Each pallet fork 301 is positioned within a corresponding housing 400 of the following blade set. For example, pallet fork 301A is positioned within housing 400A and pallet fork 301B is positioned within housing 400B.

Each housing 400 is defined by a first end and a second end. In one embodiment, the first ends of the housings 400 are represented by a set of first mechanical stops 405A and 405B and the second ends of the housings 400 are represented by a second set of mechanical stops 410A and 410B. The first mechanical stops 405 and second mechanical stops 410 are protrusions on a surface of the following blade set 103 that physically prevent the following blade set 103 from rotating past a minimum and a maximum angle relative to the driven blade set 101. The first mechanical stops 405 of the following blade set 103 contact the first mechanical stops 520 on the motor rotor (further described below with reference to FIG. 5) and bear the impact load as the lift fan transitions into the collapsed configuration. The second mechanical stops 410 contact the second mechanical stops 525 on the motor rotor (further described below with reference to FIG. 5) and bear the impact load as the lift fan transitions into the deployed configuration.

Figure 5:
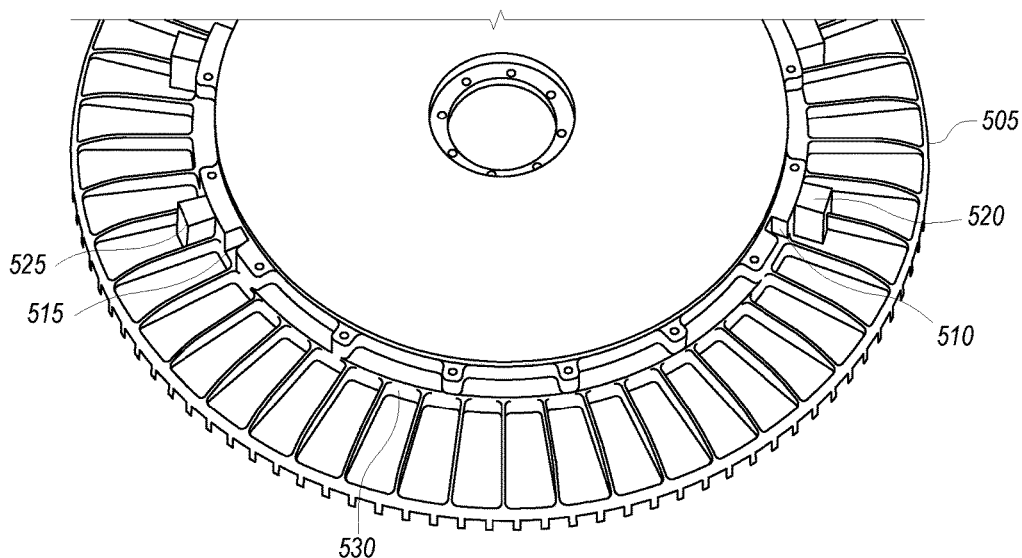
FIG. 5 illustrates a motor rotor according to one embodiment.

FIG. 5 illustrates the top side of a motor rotor 505 according to one embodiment. In one embodiment, the motor rotor has a cylindrical feature such as a cylindrical body. The cylindrical body is fixed to the driven blade set 101 and includes various components that limit the rotation of the following blade set 103 to a maximum angle of rotation (e.g., 90 degrees) from the driven blade set 101. In one embodiment, the motor rotor 505 comprises a first detent 510, a second detent 515, a first mechanical stop 520, a second mechanical stop 525, and a sliding surface 530. In this example embodiment, the following blade set 103 rotates clockwise when viewed from the top to transition from the collapsed configuration to the deployed configuration. While the following descriptions of the motor rotor 505 and its components reference only one set of features of the motor rotor 505, it is understood that embodiments of the motor rotor may comprise any multiple of the described features. The embodiment of the motor rotor 505 depicted in FIG. 5 comprises two sets of each of the features described below.

The first mechanical stop 520 and second mechanical stop 525 of the motor rotor 505 are protrusions on a surface of the motor rotor 505 that physically prevent the following blade set 103 from rotating past a minimum and a maximum angle relative to the driven blade set 101. The first mechanical stop 520 of the motor rotor 505 contacts the first mechanical stop 405 of the following blade set 103 and bears the impact load as the following blade set 103 finishes transitioning to the collapsed configuration. Similarly, the second mechanical stop 525 contacts the second mechanical stop 410 of the following blade set 103 and bears the impact load as the following blade set 103 finishes transitioning to the deployed configuration. The sliding surface 530 is a smooth surface on the motor rotor 505 that runs concentric to the circumference of the motor rotor 505 along which the first pawl 305 and second pawl 310 slide while the following blade set 103 is transitioning between the collapsed and deployed configurations.

The first detent 510 and second detent 515 are notches along the circumference of the cylindrical feature of the motor rotor 505. When the lift fan is at rest in the collapsed configuration, the first pawl 305 of the pallet fork 301 is engaged with the first detent 510 of the motor rotor 505, and the second pawl 310 is extended outward away from the center of the lift fan. The first pawl 305 rests inside the first detent 510, preventing the following blade set 103 from rotating to the deployed configuration. While in the collapsed configuration, the first mechanical stop 520 of the motor rotor 505 contacts the first mechanical stop 405 of the following blade set 103 and prevents the following blade set 103 from rotating further counter-clockwise when viewed from the top.

As the following blade set 103 rotates to transition from the collapsed configuration to the deployed configuration, the first pawl 305 of the pallet fork 301 disengages the first detent 510 of the motor rotor 505 and the first pawl 305 and second pawl 310 of the pallet fork 301 slide along the sliding surface 530 of the motor rotor. As described above, the sliding surface 530 is a guide that runs concentric to the circumference of the motor rotor 505 and provides a surface that guides the first pawl 305 and second pawl 310 as the lift fan transitions between the collapsed and deployed configurations.

When the lift fan is spinning above a threshold speed, the lift fan is in the deployed configuration. In the deployed configuration, the second pawl 310 of the pallet fork 301 is engaged with the second detent 515 of the motor rotor 505, and the first pawl 305 is extended outward away from the center of the lift fan. The second pawl 310 rests inside the second detent 515, preventing the following blade set 103 from rotating to the collapsed configuration. While in the deployed configuration, the second mechanical stop 525 of the rotor 505 contacts the second mechanical stop 410 of the following blade set 103 and prevents the following blade set 103 from rotating further clockwise when viewed from the top.

In this example embodiment, the pallet forks 301 are mounted to the following blade set 103, and the detents 510 and 515 are located on the motor rotor 505. However, in other embodiments, the pallet forks 301 may be located on the motor rotor, and the detents 510 and 515 may be located on the following blade set 103. Furthermore, in other various embodiments, the pallet forks 301 and detents 510 and 515 may be located on various other components of the lift fan to achieve the same function as the embodiment described herein. In some embodiments, the motor rotor 505 may be made of steel or may be made of other materials such as aluminum or composites.

Figure 6A:
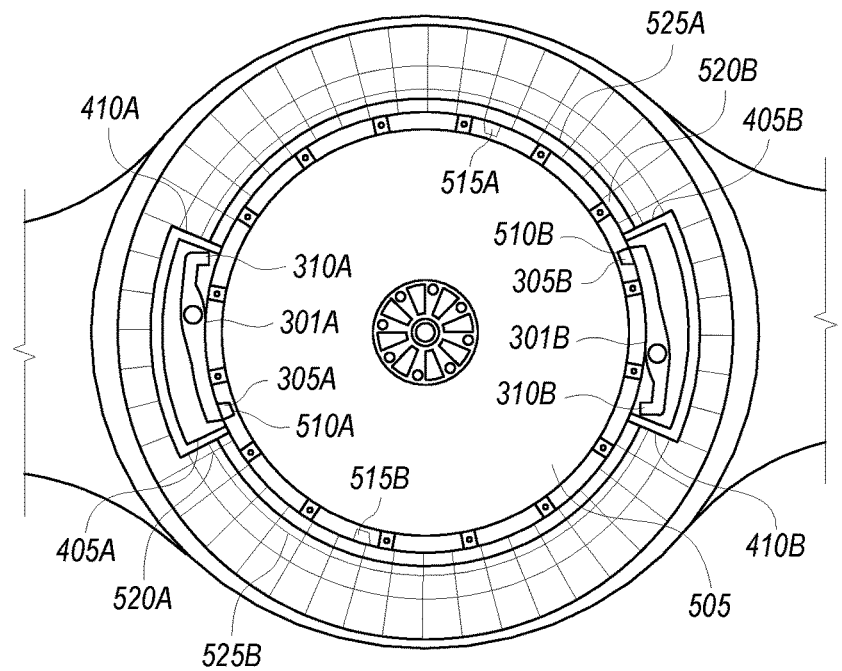
FIGS. 6A, 6B, 6C, and 6D illustrate different stages of the lift fan mechanism transitioning from the collapsed configuration to the deployed configuration according to one embodiment.
Figure 6B:
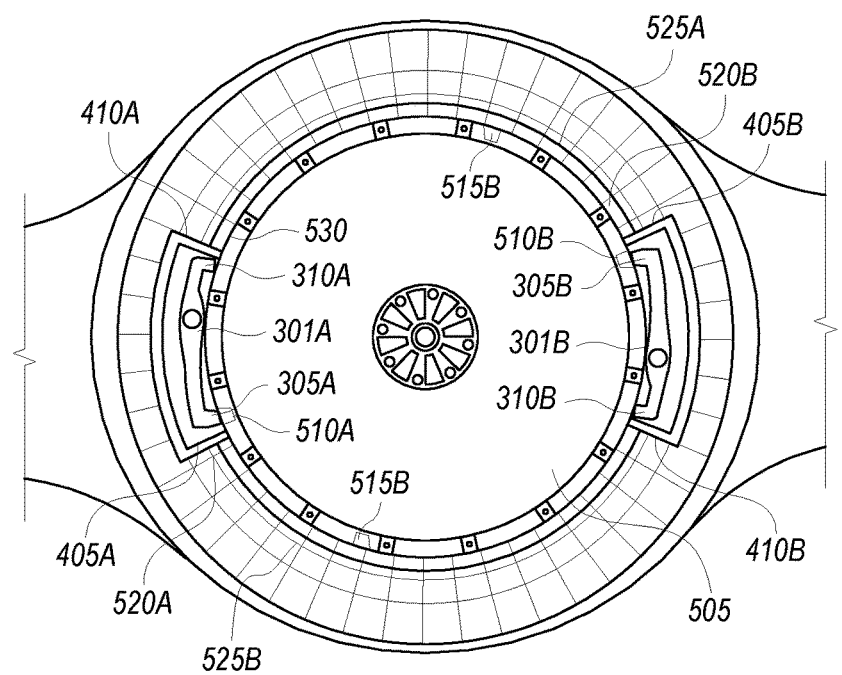

FIGS. 6A through 6D illustrate four stages of the lift fan transitioning from the collapsed configuration to the deployed configuration when viewed from the top. The following fan 103 is shown translucent in these figures. In FIGS. 6A and 6B, the following fan 103 is in the collapsed configuration and is aligned with the driven fan 101. In FIGS. 6A through 6D, the following blade set 103 rotates clockwise to transition from the collapsed configuration to the deployed configuration. The following descriptions refer to only one pallet fork 301 and the relevant features. However, it is clear that the following descriptions apply to both pallet forks 301 and relevant features depicted in FIGS. 6A-6D. Furthermore, other embodiments of the lift fan may comprise more or fewer numbers of pallet forks 301 and relevant features. FIG. 6A illustrates the lift fan in the collapsed configuration while the lift fan is at rest. The first pawl 305A of pallet fork 301A is engaged with the detent 510A and the first pawl 305B of pallet fork 301B is engaged with the detent 510B due to the force of the torsion spring 320. The second pawl 310A of pallet fork 301A and the second pawl 310B of pallet fork 301B is rotated away from the center of the motor rotor 505. Thus, the pallet forks 301 are in the first position. The first mechanical stop 405A of the following blade set 103 is in contact with the mechanical stop 520A of the rotor 505 and the first mechanical stop 405B is in contact with the mechanical stop 520B thereby preventing further rotation of the following blade set 103 in the counter clockwise direction when viewed from the top.

FIG. 6B illustrates the lift fan as it begins to transition from the collapsed configuration to the deployed configuration due to the lift fan accelerating towards the threshold speed. When the threshold speed is exceeded, the pallet forks 301A, 301B rotate until the second pawl 310A of pallet fork 301A and the second pawl 310B of pallet fork 301B contact the sliding surface 530. At this point, the pallet forks 301A, 301B are in its second position. That is, the centrifugal force acting on the pallet forks 301A, 301B has rotated the pallet forks 301A, 301B such that the first pawl 305A of pallet fork 301A and the first pawl 305B of pallet fork 301B has moved away from the center of the lift fan, and the second pawl 310A of pallet fork 301A and the second pawl 310B of pallet fork 301B has moved toward the center of the lift fan. Thus, The first pawl 305A and the first pawl 305B are no longer engaged with the first detent 510A, 510B, allowing the following blade set 103 to rotate. During rotation, the first pawl 305A and the first pawl 305B or the second pawl 310A and the second pawl 310B contact the sliding surface 530 and slide along the sliding surface 530 until the second mechanical stop 410A, 410B of the following blade set 103 contacts the second mechanical stop 525A, 525B of the motor rotor 505.

Figure 6C:
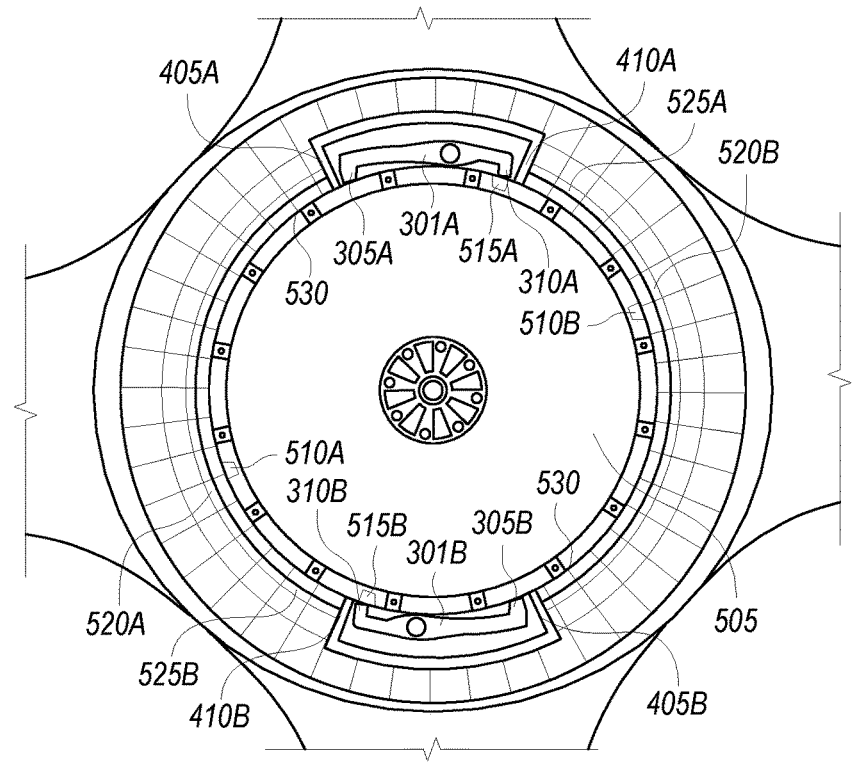

FIG. 6C illustrates the lift fan just prior to being in the deployed configuration according to one embodiment. The second pawl 310A, 310B are about to engage the second detent 515A and 515B respectively. The first pawl 305A, 305B is still nearly in contact with the sliding surface 530 and the second mechanical stop 410A, 410B of the following blade set 103 is now in contact with the second mechanical stop 525A, 525B of the rotor 505.

Figure 6D:
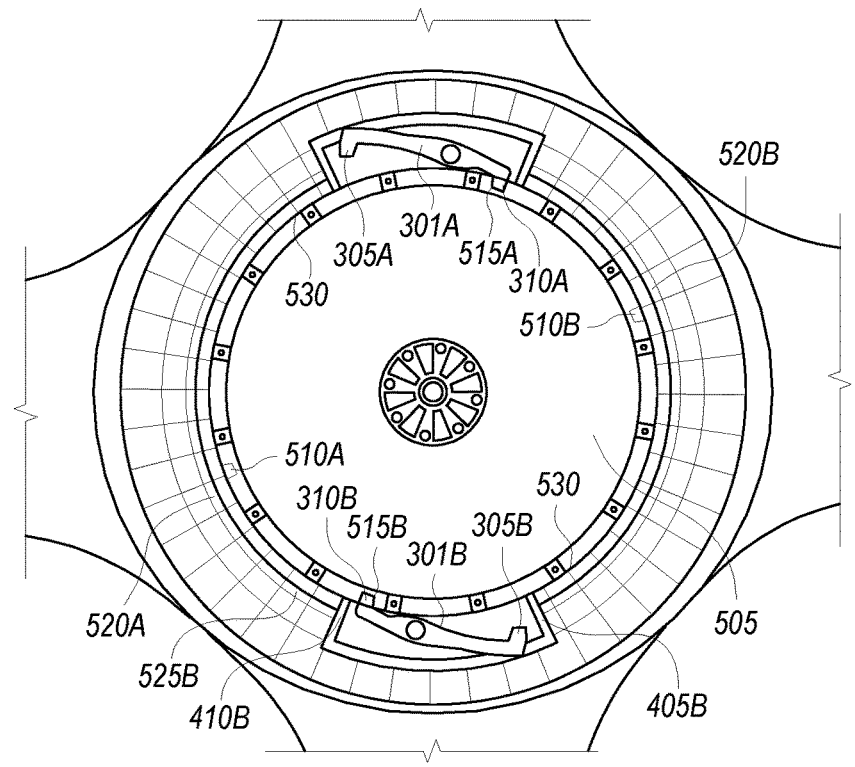

FIG. 6D illustrates the lift fan in the fully deployed configuration. Because the lift fan is still spinning above the threshold speed, the centrifugal force acting on the pallet forks 301A, 301B is great enough to overcome the force of the tension spring, causing the second pawl 310A, 310B to respectively engage with the second detent 515A, 515B and the first pawl 305A, 305B is rotated away from the center of the motor rotor 505. The pallet forks 301A, 301B are in the third position. The lift fan is fully deployed and the pallet forks 301A, 301B prevent the lift fan from transitioning back to the collapsed configuration until the lift fan no longer exceeds the threshold speed.

Figure 7A:
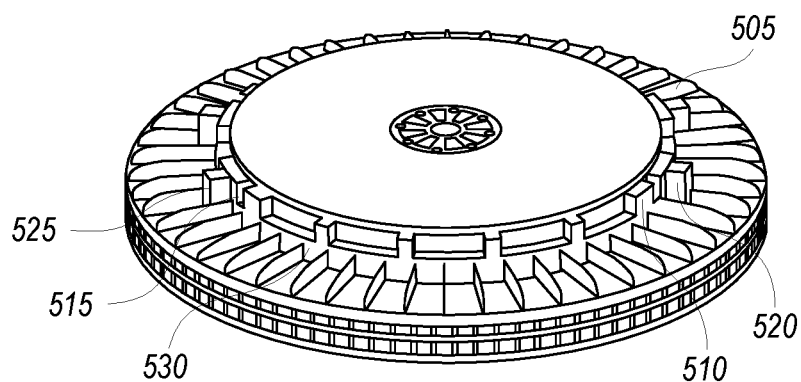
FIGS. 7A and 7B respectively illustrate detailed views of the motor rotor according to one embodiment.
Figure 7B:
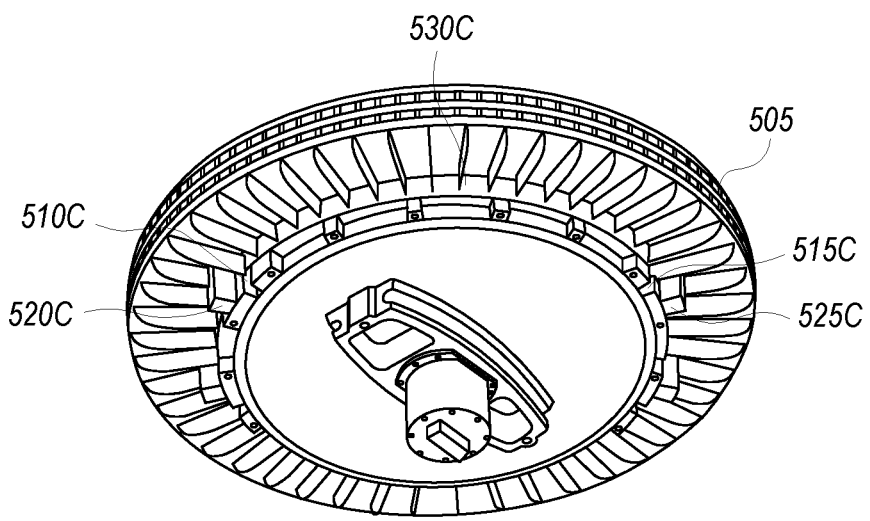

FIG. 7A illustrates the top side view of the motor rotor 505 according to one embodiment. In one embodiment, the motor rotor 505 comprises features similar to those as described with reference to FIG. 5 on the top side, but also has an identical set of features on the bottom side as shown in FIG. 7B. This embodiment has the advantage that a single motor design can be used with the fixed and following fans assembled in either a right side up or an upside down configuration. In both of these configurations, the following blade set 103 is assembled on the top side, hence the need to have stops and detents on both sides of the motor rotor.

The bottom side of the motor rotor 505 shown in FIG. 7B also comprises a bottom collapsed detent 510C, a bottom deployed detent 515C, a bottom collapsed mechanical stop 520C, a bottom deployed mechanical stop 525C, and a bottom sliding surface 530C. The motor rotor 505 depicted in FIGS. 7A and 7B allows the following blade set 103 to be mounted on either the top or the bottom of the motor rotor 105 and still be allowed to rotate between and lock in the collapsed and deployed positions. The bottom first detent 510C and bottom second detent 515C are notches in a surface of the motor rotor 505. When the lift fan is in the collapsed configuration, the first pawl 305 of the pallet fork 301 engages in the bottom first detent 510C if the following blade set 103 is attached to the bottom of the motor rotor 505. When the lift fan is in the deployed configuration, the second pawl 310 of the pallet fork 301 engages in the bottom second detent 515C. The bottom first mechanical stop 520C and bottom second mechanical stop 525C are protrusions on a surface of the motor rotor 505 that physically prevent the following blade set 103 from rotating past a maximum angle relative to the driven blade set 101. The bottom first mechanical stop 520C bears the impact load as the following blade set 103 finishes transitioning to the collapsed configuration. The bottom second mechanical stop 525C bears the impact load as the following blade set 103 finishes transitioning to the deployed configuration. The bottom sliding surface 530C is a smooth surface on the motor rotor 505 that runs concentric to the circumference of the motor rotor 505 along which the first pawl 305 and second pawl 310 can slide while the following blade set 103 is transitioning between the collapsed and deployed configurations.

Figure 8A:
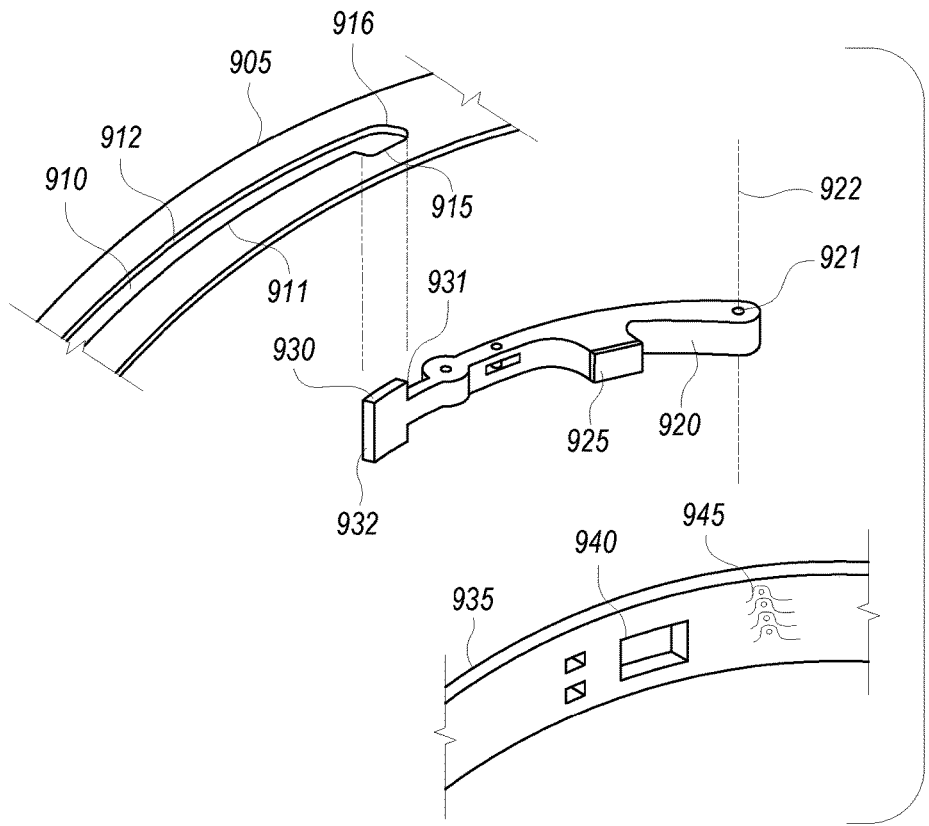
FIGS. 8A, 8B, and 8C illustrate a lift fan mechanism according to an alternative embodiment.

FIG. 8A illustrates an alternative embodiment of a latching mechanism for the folding lift fan depicted in FIG. 1. The latching mechanism comprises a guide assembly 905. The guide assembly 905 is fixed to the motor rotor 505 and comprises a cylindrical feature such as a slot guide 910, a first detent 915, a mechanical stop 916, a second detent 950 (shown in FIG. 8B), and a second mechanical stop 951 (shown in FIG. 8B). The slot guide 910 is a long, thin opening in the guide assembly 905 through which a tab 930 of the pallet fork 920 can slide as further described below with reference to FIGS. 8B and 8C. The tab 930 comprises a first face 931 and a second face 932. In one embodiment, the two faces 931 and 932 act as both mechanical stops and as pawls. The first detent 915 is a notch formed in an inner edge 911 of the slot guide 910, and the second detent 950 is a notch formed in an outer edge 912 of the slot guide 910. When the lift fan is in the collapsed configuration, the second face 932 of the tab 930 of the pallet fork 920 engages in the first detent 915 and the first face 931 of the tab 930 engages with the mechanical stop 916. When the lift fan is in the deployed configuration, the first face 931 of the tab 930 of the pallet fork 920 engages in the second detent 950 and the second face 932 of the tab 930 engages with the second mechanical stop 951.

The latching mechanism also comprises a pallet fork 920. The pallet fork 920 comprises a pivot hole 921 at a first end of the pallet fork 920, a friction pad 925, and a tab 930 at a second end of the pallet fork 920. An axle can extend through the pivot hole 921, allowing the pallet fork 920 to rotate about an axis 922. The pivot hole 921 is positioned on the pallet fork 920 such that the friction pad 925, the center of gravity, and tab 930 are all on the same side of the pivot hole 921.

Figure 8B:
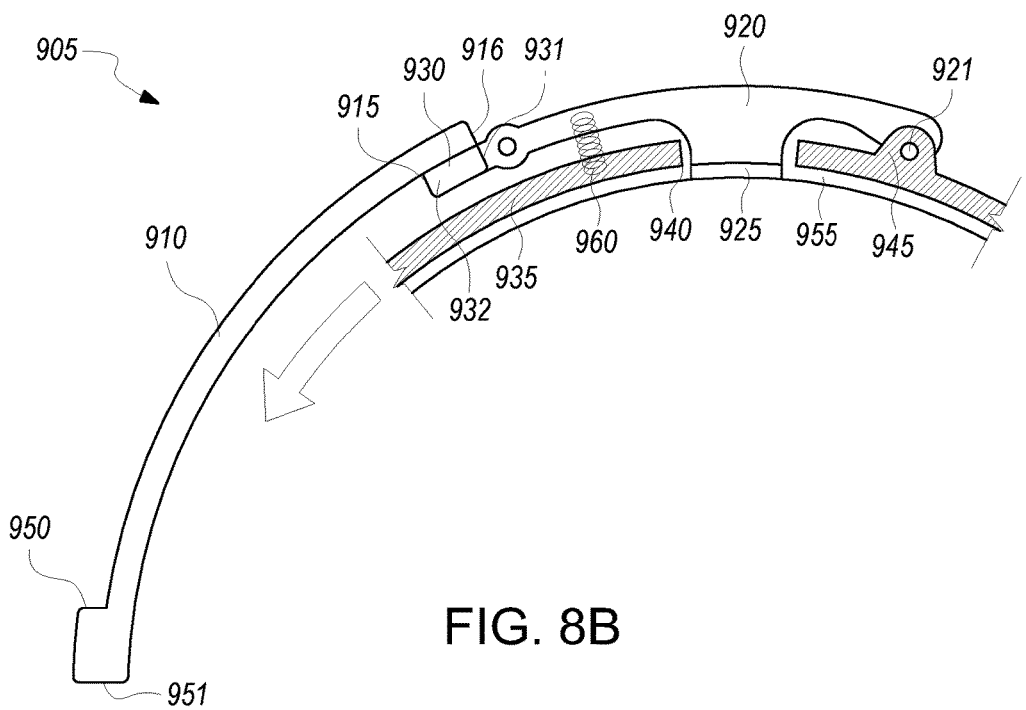
Figure 8C:
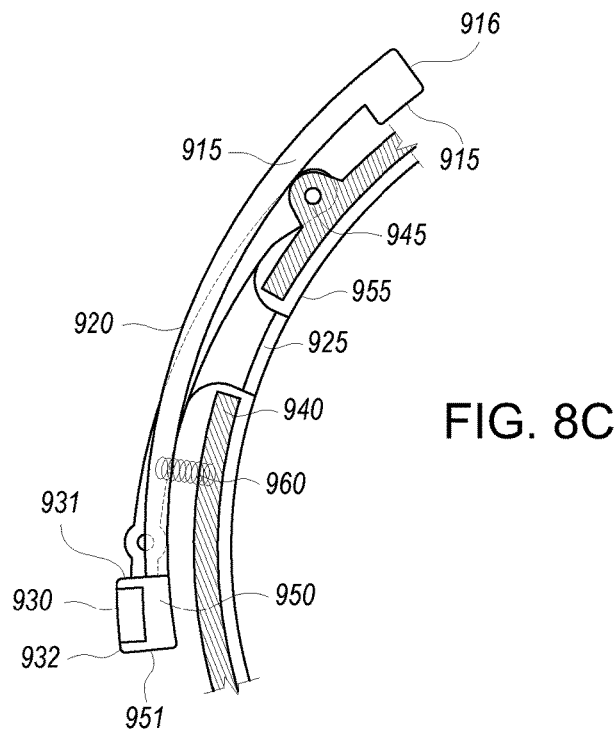

In one embodiment, the mechanism comprises a friction pad 925 that is a protrusion from a surface of the pallet fork 920. In some embodiments, the surface of the friction pad 925 is made of a material with a high coefficient of friction such as brake pad material. The tab 930 protrudes on both the top and bottom of the pallet fork 920 that engage a detent in a guide assembly 905 as will be further described below with reference to FIGS. 8B and 8C. The pallet fork 920 rotates about the axis 922 between three distinct positions. The pallet fork 920 is in a first position when the pallet fork 920 is rotated counter clockwise about the axis 922 such that the tab 930 is engaged with a first detent 915 of the guide assembly 905, and the friction pad 925 is engaged with a friction surface 955 as depicted in FIG. 8B. The first position of the pallet fork 920 is associated with the collapsed configuration of the lift fan. In the collapsed configuration, the motor is not applying torque to the rotor and the friction between the friction pad 925 and the friction surface 955 prevents torque disturbances due to airflow, and other torque disturbances from causing the rotor to rotate. This allows the motor to be de-energized, which saves energy. The pallet fork 920 is in a second position when the pallet fork 920 is rotated such that the tab 930 slides along the slot guide 910, as further described below. The second position of the pallet fork 920 is associated with the transitional configuration between the collapsed and deployed configurations of the lift fan, as further described below. The pallet fork 920 is in a third position when the pallet fork 920 is rotated such that the tab 930 is engaged in a second detent 950 of the guide assembly 905, as depicted in FIG. 8C. The third position of the pallet fork 920 is associated with the deployed configuration of the lift fan. The pallet fork 920 is preloaded to rotate counter clockwise by a spring 960, shown in FIGS. 8B and 8C. In one embodiment, the spring 960 comprises a wire formed into a plurality of coils and is mounted such that one end of the spring 960 is connected to the pallet fork 920 and the other end of the spring 960 is connected to a pallet fork mount 935, further described below.

The latching mechanism also comprises a pallet fork mount 935. The pallet fork mount 935 is fixed to the following blade set 103 and comprises a friction pad hole 940 and a pivot hinge 945. The friction pad hole 940 is an opening formed in the pallet fork mount 935 through which the friction surface 925 of the pallet fork 920 can extend. The pivot hinge 945 is a protrusion on a surface of the pallet fork mount 935 with a hole through which an axle can extend. The pallet fork 920 is mounted to the pallet fork mount 935 by an axle that extends through both the pivot hole 921 of the pallet fork 920 and the hole in the pivot hinge 945 of the pallet fork mount 935. This allows the pallet fork 920 to rotate relative to the pallet fork mount 935 about the axis 922.

FIG. 8B illustrates a top down view of the latching mechanism depicted in FIG. 8A in the collapsed position. The folding lift fan is stationary and the spring 960 is applying a force on the pallet fork 920 such that the pallet fork 920 rotates counter clockwise and the tab 930 moves inward toward the pallet fork mount 935. The friction pad 925 of the pallet fork 920 extends through the friction pad hole 940 and contacts a friction surface 955 of the driven blade set 101. Additionally, the tab 930 of the pallet fork 920 is engaged in the first detent 915 of the guide assembly 905. The friction pad 925 and the tab 930 both prevent the following blade set 103 from rotating out of the collapsed configuration.

FIG. 8C illustrates a top down view of the latching mechanism depicted in FIG. 8A in the deployed position. As the lift fan starts spinning and exceeds a threshold speed, the centrifugal force acting on the pallet fork 920 causes the pallet fork 920 to overcome the force exerted by the spring 960 and rotate clockwise, moving the tab 930 outward away from the pallet fork mount 935. This causes the tab 930 to disengage from the first detent 915 and also allows the friction pad 925 to release from the friction surface 955. This allows the following blade set 103, pallet fork mount 935, and pallet fork 920 to rotate counterclockwise relative to the driven blade set 101 and guide assembly 905. Once the lift fan has rotated fully to the deployed configuration, the second surface 932 of the tab 930 of the pallet fork 920 engages with the second mechanical stop 951, which prevents further rotation. Because the lift fan is still spinning above the threshold speed, the centrifugal force acting on the pallet fork 920 overcomes the force exerted by the spring 960, and moves into the third position. The first surface 931 of the tab 930 becomes engaged in the deployed detent 950, preventing the following blade set 103 from rotating out of the deployed configuration. The pallet fork 920 will prevent the lift fan from transitioning back to the collapsed configuration until the lift fan no longer exceeds the threshold speed. In other embodiments, the pallet fork 920 may have the tab 930 but may not have a friction pad 925. In other embodiments, the pallet fork 920 may only have the friction pad 925 and not utilize a tab 930. In some embodiments, the pallet fork 920, pallet fork mount 935, and guide assembly 905 may be made from titanium or other metal or composite materials.

Figure 9A:
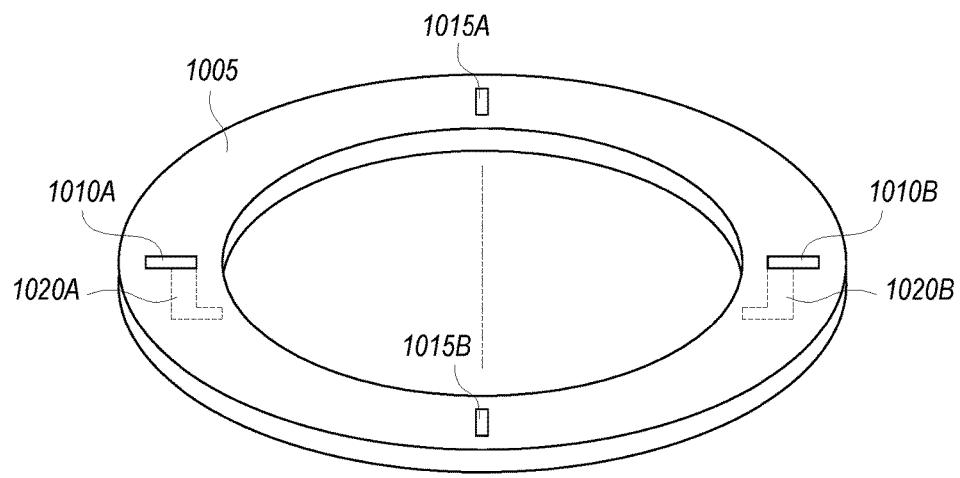
FIGS. 9A, 9B, and 9C illustrate a lift fan mechanism according to another alternative embodiment.

FIG. 9A illustrates another alternative embodiment of a latching mechanism for the folding lift fan depicted in FIG. 1. The latching mechanism comprises a cylindrical feature such as a slot assembly 1005 that is fixed to the driven blade set 101. The slot assembly 1005 comprises first slots 1010A and 1010B and second slots 1015A and 1015B. The first slots 1010 and second slots 1015 are holes formed in the slot assembly. When the lift fan is in the collapsed configuration, the first arm 1025 of the pallet fork 1020 engages in the first slot 1010, as further described below with reference to FIG. 9B. When the lift fan is in the deployed configuration, the second arm 1030 of the pallet fork 1020 engages in the second slot 1015, as further described below with reference to FIG. 9C.

Figure 9B:
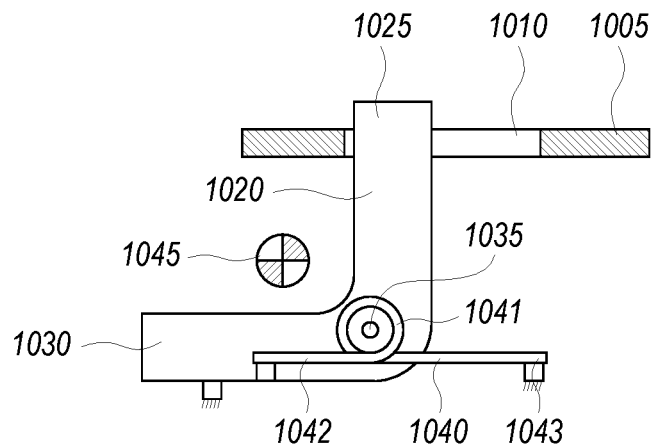
Figure 9C:
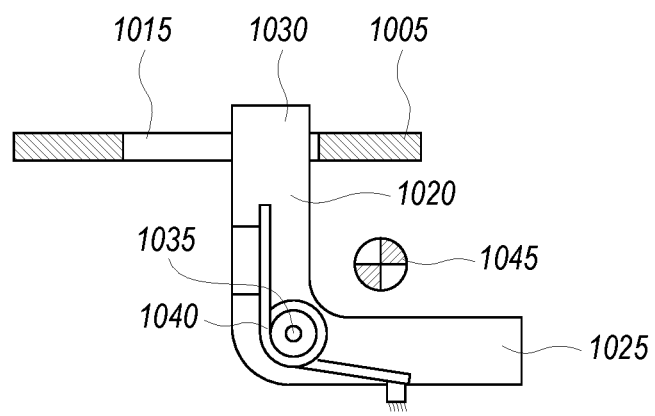

The latching mechanism further comprises pallet forks 1020A and 1020B. Referring now to FIG. 9B, each pallet fork 1020 is mounted to the following blade set 103, and comprises a first arm 1025, a second arm 1030, a pivot 1035, a torsion spring 1040, and a center of mass 1045. The first arm 1025 and second arm 1030 extends from the pivot 1035 at a fixed angle, and the fixed angle is 90 degrees in one embodiment. The first arm 1025 and second arm 1030 engage in slots in a slot assembly 1005, further described below. The pivot 1035 is a hinge assembly that mounts the pivot 1035 to the following blade set 103 and allows the pallet fork 1020 to rotate clockwise and counter clockwise as shown in FIGS. 9B and 9C. The torsion spring 1040 is a wire formed into a plurality of coils 1041 with a first end 1042 and a second end 1043. The first end 1042 abuts a surface on the pallet fork 1020, the second end abuts a surface on the following blade set 103, and the plurality of coils 1041 surrounds the pivot 1035. The torsion spring exerts a force on the pallet fork 1020 such that the pallet fork 1020 is preloaded to rotate counterclockwise, causing the first arm 1025 to engage in a first slot 1010, further described below.

The pallet fork 1020 rotates about the pivot 1035 between three distinct positions. The pallet fork 1020 is in a first position when the pallet fork 1020 is rotated counter clockwise about the pivot 1035 such that the first arm 1025 is engaged with the first detent 1010 of the slot assembly 1005, as depicted in FIG. 9B. The first position of the pallet fork 1020 is associated with the collapsed configuration of the lift fan. The pallet fork 1020 is in its second position when the pallet fork 1020 is rotated slightly clockwise from its first position, such that the first arm 1025 is not engaged in the first slot 1010 and the second arm 1030 is not engaged in a second slot 1015. The second position of the pallet fork 1020 is associated with the transitional configuration between the collapsed and deployed configurations, as further described below. The pallet fork 1020 is in a third position when the pallet fork 1020 is rotated further clockwise such that the second arm 1030 is engaged with the second slot 1015 of the slot assembly 1005, as depicted in FIG. 9C. The third position of the pallet fork 1020 is associated with the deployed configuration of the lift fan.

FIG. 9B illustrates the pallet fork 1020B depicted in FIG. 9A in the collapsed configuration. In the collapsed configuration, the lift fan is at rest, and the torsion spring 1040 exerts a force on the pallet fork 1020 such that the first arm 1025 of the pallet fork 1020 is engaged in the first slot 1010 of the slot assembly 1005, preventing the following blade set 103 from rotating out of the collapsed configuration.

FIG. 9C illustrates the pallet fork 1020B depicted in FIG. 9A in the deployed configuration. As the lift fan spins above a threshold speed, the centrifugal force acting on the center of mass 1045 overpowers the force exerted on the pallet fork 1020 by the torsion spring 1040, and the pallet fork 1020 rotates clockwise around the pivot 1035. This causes the first arm 1025 to disengage the first slot 1010, allowing the following blade set 103 to rotate out of the collapsed configuration. Once the following blade set 103 rotates to the fully deployed configuration, the centrifugal force acting on the pallet fork 1020 causes the second arm 1030 of the pallet fork 1020 to engage in the second slot 1015 of the slot assembly 1005, preventing the following blade set 103 from rotating out of the deployed configuration. The pallet fork 1020 will prevent the lift fan from transitioning back to the collapsed configuration until the lift fan no longer exceeds the threshold speed. In some embodiments, the slot assembly 1005 and pallet fork 1020 may be made from titanium. In other embodiments, the slot assembly 1005 and the pallet fork 1020 may be made from other metal or composite materials.

Although this description has been provided in the context of specific embodiments, those of skill in the art will appreciate that many alternative embodiments may be inferred from the teaching provided. Furthermore, within this written description, the particular naming of the components, capitalization of terms, the attributes, data structures, or any other structural or programming aspect is not mandatory or significant unless otherwise noted, and the mechanisms that implement the described invention or its features may have different names, formats, or protocols. Further, some aspects of the system may be implemented via a combination of hardware and software or entirely in hardware elements. Also, the particular division of functionality between the various system components described here is not mandatory; functions performed by a single module or system component may instead be performed by multiple components, and functions performed by multiple components may instead be performed by a single component. Likewise, the order in which method steps are performed is not mandatory unless otherwise noted or logically required.

Unless otherwise indicated, discussions utilizing terms such as "selecting" or "computing" or "determining" or the like refer to the action and processes of a computer system, or similar electronic computing device, that manipulates and transforms data represented as physical (electronic) quantities within the computer system memories or registers or other such information storage, transmission or display devices.

Finally, it should be noted that the language used in the specification has been principally selected for readability and instructional purposes, and may not have been selected to delineate or circumscribe the inventive subject matter. Accordingly, the disclosure is intended to be illustrative, but not limiting, of the scope of the invention.

What is claimed is:

1. A lift fan mechanism comprising:
    a motor rotor comprising a cylindrical feature with a first detent located at a first position along a circumference of the cylindrical feature and a second detent located at a second position along the circumference of the cylindrical feature, the motor rotor driven to rotate about an axis;
    a first blade set comprising one or more first fan blades, the first blade set coupled to the motor rotor and configured to rotate about the axis of the motor rotor as the motor rotor rotates about the axis;
    a second blade set comprising one or more second fan blades, the second blade set coupled to the motor rotor and configured to rotate independently from the first blade set about the axis of the motor rotor, the second blade set rotating between a collapsed configuration and a deployed blade configuration that provides maximum thrust of the lift fan mechanism;
    one or more pallet forks each coupled to the second blade set, each pallet fork comprising a body, a pivot, a first pawl surface, and a second pawl surface, and each pallet fork configured to rotate between a first pallet fork position and a second pallet fork position about an axis of the pivot, wherein in the first pallet fork position the first pawl surface is configured to engage the first detent responsive to the second blade set being in the collapsed configuration, and in the second pallet fork position the second pawl surface is configured to engage the second detent responsive to the second blade set being in the deployed configuration; and
    a drive motor coupled to the motor rotor, the drive motor configured to apply torque to the motor rotor rotating the first blade set, wherein rotation of the first blade set rotates the second blade set from the collapsed configuration to the deployed configuration and from the deployed configuration to the collapsed configuration.

2. The lift fan mechanism of claim 1, wherein the second blade set transitions from the collapsed configuration to the deployed configuration responsive to the first blade set rotating above a threshold speed.

3. The lift fan mechanism of claim 2, wherein the second blade set transitions from the deployed configuration to the collapsed configuration responsive to the first blade set rotating below the threshold speed.

4. The lift fan mechanism of claim 1, wherein the second blade set transitions from the collapsed configuration to the deployed configuration responsive to the first blade set accelerating above a threshold acceleration.

5. The lift fan mechanism of claim 4, wherein the second blade set transitions from the deployed configuration to the collapsed configuration responsive to the first blade set accelerating below the threshold acceleration.

6. The lift fan mechanism of claim 1, wherein the second blade set further comprises:
    one or more housings formed in the second blade set, each housing having a first end and a second end, wherein each of the one or more pallet forks is positioned within a corresponding one of the housings.

7. The lift fan mechanism of claim 6, wherein the motor rotor further comprises:
    a first stop positioned adjacent to the first detent, the first stop configured to engage the first end of one of the housings of the second blade set preventing the second blade set from rotating past the first stop when the second blade set rotates from the deployed configuration to the collapsed configuration; and
    a second stop positioned adjacent to the second detent, the second stop configured to engage the second end of one of the housings of the second blade set preventing the second blade set from rotating past the second stop when the second blade set rotates from the collapsed configuration to the deployed configuration.

8. The lift fan mechanism of claim 1, wherein the first detent and the second detent are positioned along the circumference of the cylindrical feature at a first end of the motor rotor and wherein the motor rotor further comprises:
    a third detent positioned along the circumference of the cylindrical feature at a second end of the motor rotor;
    a third stop positioned adjacent to the third detent;
    a fourth detent positioned along the circumference of the cylindrical feature at the second end of the motor rotor; and
    a fourth stop positioned adjacent to the third detent.

9. The lift fan mechanism of claim 1, wherein in the first pallet fork position the first pawl is configured to engage the first detent by rotating towards a center of the motor rotor and the second pawl is configured to rotate away from the center of the motor rotor and wherein in the second pallet fork position the second pawl is configured to engage the second detent by rotating towards the center of the motor rotor and the first pawl is configured to rotate away from the center of the motor rotor.

10. The lift fan mechanism of claim 1, wherein during a transition from the collapsed configuration to the deployed configuration, the first pawl of each pallet fork is configured to disengage the first detent by rotating about the pivot of the pallet fork away from a center of the motor rotor to unlock the second blade set from the collapsed configuration.

11. The lift fan mechanism of claim 10, wherein during a transition from the deployed configuration to the collapsed configuration, the second pawl of each pallet fork is configured to disengage the second detent by rotating about the pivot of the pallet fork away from the center of the motor rotor to unlock the second blade set from the deployed configuration.

12. The lift fan mechanism of claim 1, wherein at least one of the first blade set and the second blade set include two-bladed fans.

13. The lift fan mechanism of claim 1, wherein the drive motor is an electric motor.

14. A lift fan mechanism comprising:
a first blade set comprising one or more first fan blades, the first blade set configured to rotate about an axis;
a second blade set comprising one or more second fan blades, the second blade set configured to rotate independently from the first blade set about the axis, the second blade set rotating between a collapsed configuration and a deployed blade configuration that provides maximum thrust of the lift fan mechanism;
a mechanism between the first blade set and the second blade set, the mechanism coupling together the first blade set and the second blade set; and
one or more pallet forks, each pallet fork coupled to the second blade set and configured to rotate between a first pallet fork position responsive to the second blade set in the collapsed configuration and a second pallet fork configuration responsive to the second blade set in the deployed configuration; and
a drive motor configured to apply torque to rotate the first blade set, wherein rotation of the first blade set rotates the second blade set from the collapsed configuration to the deployed configuration and from the deployed configuration to the collapsed configuration.

15. The lift fan mechanism of claim 14, wherein the second blade set transitions from the collapsed configuration to the deployed configuration responsive to the first blade set rotating above a threshold speed and wherein the second blade set transitions from the deployed configuration to the collapsed configuration responsive to the first blade set rotating below the threshold speed.

16. The lift fan mechanism of claim 14, wherein the mechanism is a motor rotor comprising a cylindrical feature with a first detent located at a first position along a circumference of the cylindrical feature and a second detent located at a second position along the circumference of the cylindrical feature.

17. The lift fan mechanism of claim 16, wherein each pallet fork comprises a body, a pivot, a first pawl at a first end of the body, and a second pawl at a second end of the body, and each pallet fork configured to rotate between a first pallet fork position and a second pallet fork position about an axis of the pivot, wherein in the first pallet fork position the first pawl is configured to engage the first detent responsive to the second blade set being in the collapsed configuration, and in the second pallet fork position the second pawl is configured to engage the second detent responsive to the second blade set being in the deployed configuration.

18. The lift fan mechanism of claim 16, wherein the second blade set further comprises:
one or more housings formed in the second blade set, each housing having a first end and a second end, wherein each of the one or more pallet forks is positioned within a corresponding one of the one or more housings.

19. The lift fan mechanism of claim 18, wherein the motor rotor further comprises:
a first stop positioned adjacent to the first detent, the first stop configured to engage the first end of one of the housings of the second blade set preventing the second blade set from rotating past the first stop when the second blade set rotates from the deployed configuration to the collapsed configuration; and
a second stop positioned adjacent to the second detent, the second stop configured to engage the second end of one of the housings of the second blade set preventing the second blade set from rotating past the second stop when the second blade set rotates from the collapsed configuration to the deployed configuration.

20. The lift fan mechanism of claim 14, wherein the mechanism is a slot assembly including a cylindrical feature, a first detent formed at an inner edge of a first end of the cylindrical feature, and a second detent formed at an outer edge of a second end of the cylindrical feature.

21. The lift fan mechanism of claim 20, further comprising:
a pallet fork mount coupled to the second blade set, the pallet fork mount including a friction hole and a hinge; and
one or more springs, each spring coupling one of the pallet forks to the pallet fork mount.

22. The lift fan mechanism of claim 21, wherein each pallet fork includes a pivot hole at a first end of the pallet fork coupled to the pallet fork mount, a friction surface protruding through the friction hole and contacting the first blade set, and a tab at a second end of the pivot fork.

23. The lift fan mechanism of claim 22, wherein each pallet fork is configured to rotate about an axis of the pallet fork's hinge to engage the tab with the first detent and the friction surface with the first blade set responsive to the second blade set in the collapsed configuration, and to disengage the tab from the first detent and the friction surface from the first blade set to allow the tab to travel along the cylindrical feature responsive to the second blade set transitioning from the collapsed configured to the deployed configuration, and to engage the tab and the second detent responsive to the second blade set in the deployed configuration.

24. The lift fan mechanism of claim 13, wherein the mechanism is a slot assembly coupled to the first blade set, the slot assembly including a plurality first holes and a plurality of second holes.

25. The lift fan mechanism of claim 24, wherein each pallet fork includes a first arm and a second arm, the first arm of each pallet fork configured to engage one of the plurality of first holes responsive to the second blade set in the collapsed configuration and the second arm of each pallet fork configured to engage one of the plurality of second holes responsive to the second blade set in the deployed configuration.

26. The lift fan mechanism of claim 25, wherein each pallet fork further comprises a spring that preloads the first arm to engage one of the plurality of first holes responsive to the second bade set in the collapsed configuration.

27. A vertical takeoff and landing aircraft comprising:
a plurality of lift fan mechanisms, each lift fan mechanism including:
a first blade set comprising one or more first fan blades, the first blade set configured to rotate about an axis;
a second blade set comprising one or more second fan blades, the second blade set configured to rotate independently from the first blade set about the axis, the second blade set rotating between a collapsed configuration and a deployed blade configuration that provides maximum thrust of the lift fan mechanism;
a mechanism between the first blade set and the second blade set, the mechanism coupling together the first blade set and the second blade set; and
one or more pallet forks, each pallet fork coupled to the second blade set and configured to rotate between a first pallet fork position responsive to the second blade set in the collapsed configuration and a second pallet fork configuration responsive to the second blade set in the deployed configuration; and a drive motor configured to apply torque to rotate the first blade set, wherein rotation of the first blade set rotates the second blade set from the collapsed configuration to the deployed configuration and from the deployed configuration to the collapsed configuration.

* * * * *

UNITED STATES PATENT AND TRADEMARK OFFICE
CERTIFICATE OF CORRECTION

PATENT NO. : 9,540,103 B2  
APPLICATION NO. : 14/313680  
DATED : January 10, 2017  
INVENTOR(S) : Geoffrey Alan Long Page 1 of 1

It is certified that error appears in the above-identified patent and that said Letters Patent is hereby corrected as shown below:

In Item (56), Other Publications, delete "PCT/I82015/054652", and insert --PCT/IB2015/054652--, therefor.

Signed and Sealed this  
Sixth Day of June, 2017

Michelle K. Lee  
*Director of the United States Patent and Trademark Office*